Figure 1:
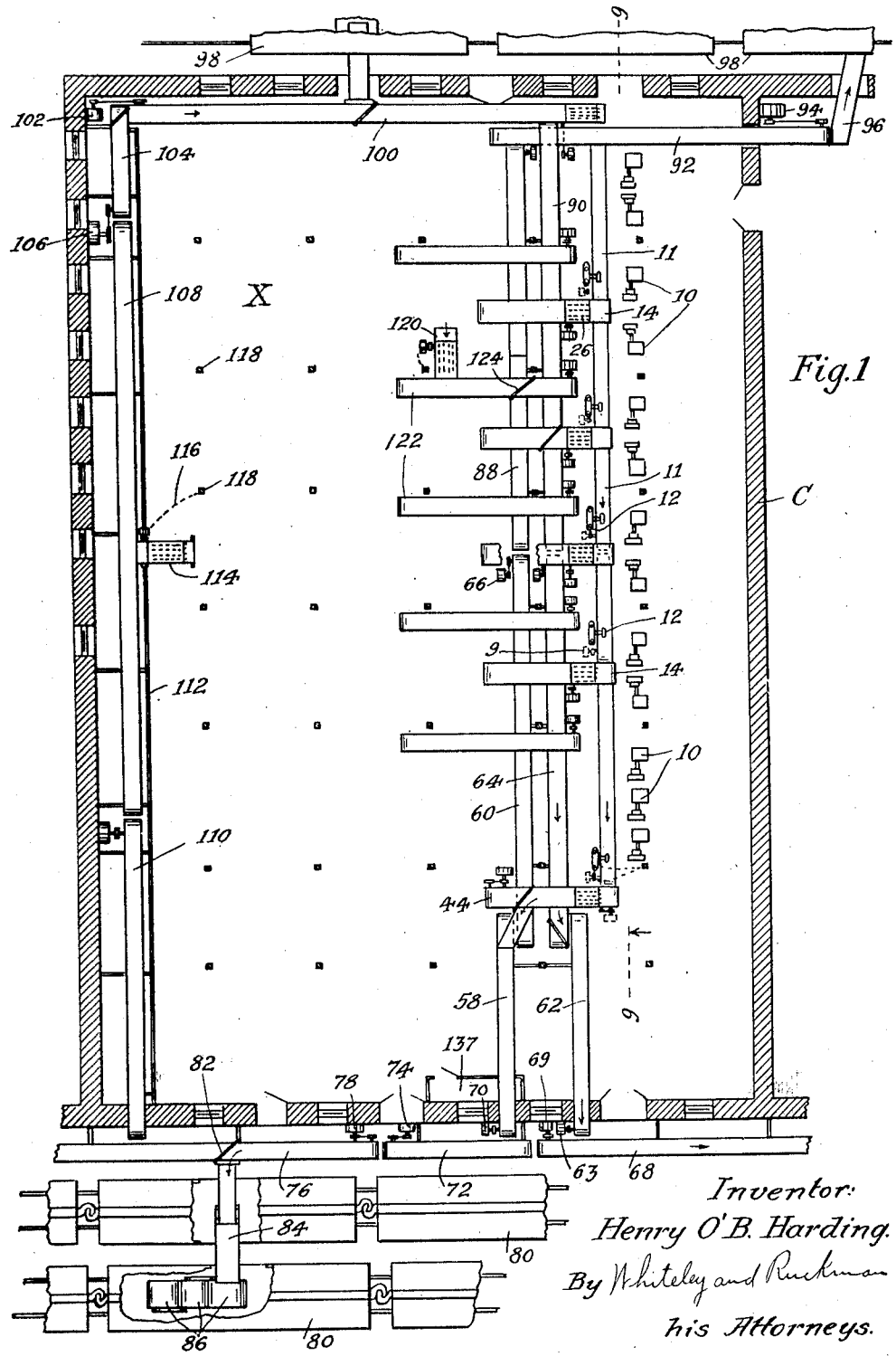

H. O'B. HARDING.
SYSTEM OF HANDLING FLOUR IN MILLS.
APPLICATION FILED MAY 20, 1919.

1,357,977.

Patented Nov. 9, 1920.

7 SHEETS—SHEET 1.

Inventor:
Henry O'B. Harding.
By Whiteley and Ruckman
his Attorneys.

H. O'B. HARDING.
SYSTEM OF HANDLING FLOUR IN MILLS.
APPLICATION FILED MAY 20, 1919.
1,357,977.
Patented Nov. 9, 1920.
7 SHEETS—SHEET 2.
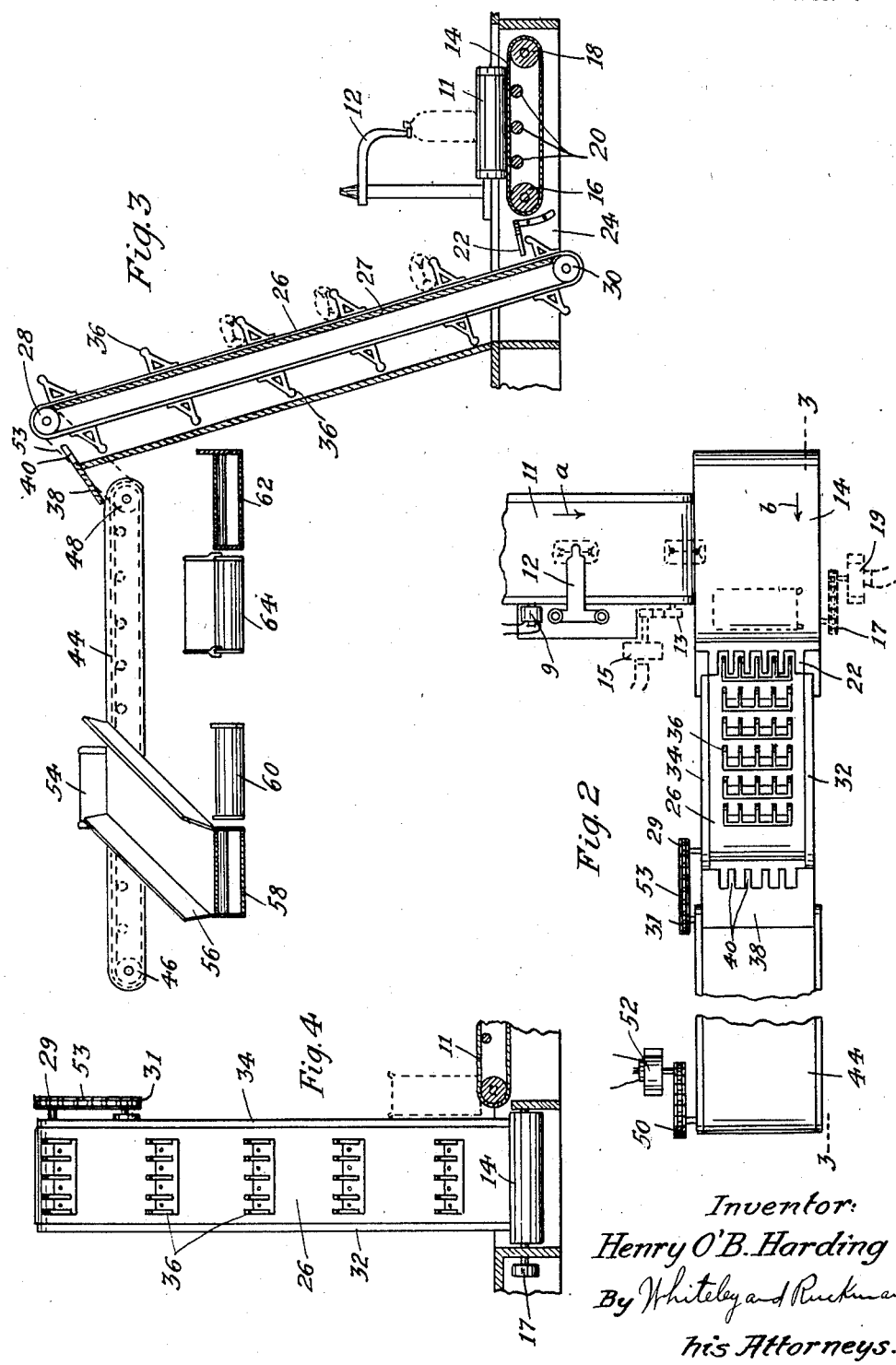
Inventor:
Henry O'B. Harding
By Whiteley and Ruckman
his Attorneys.

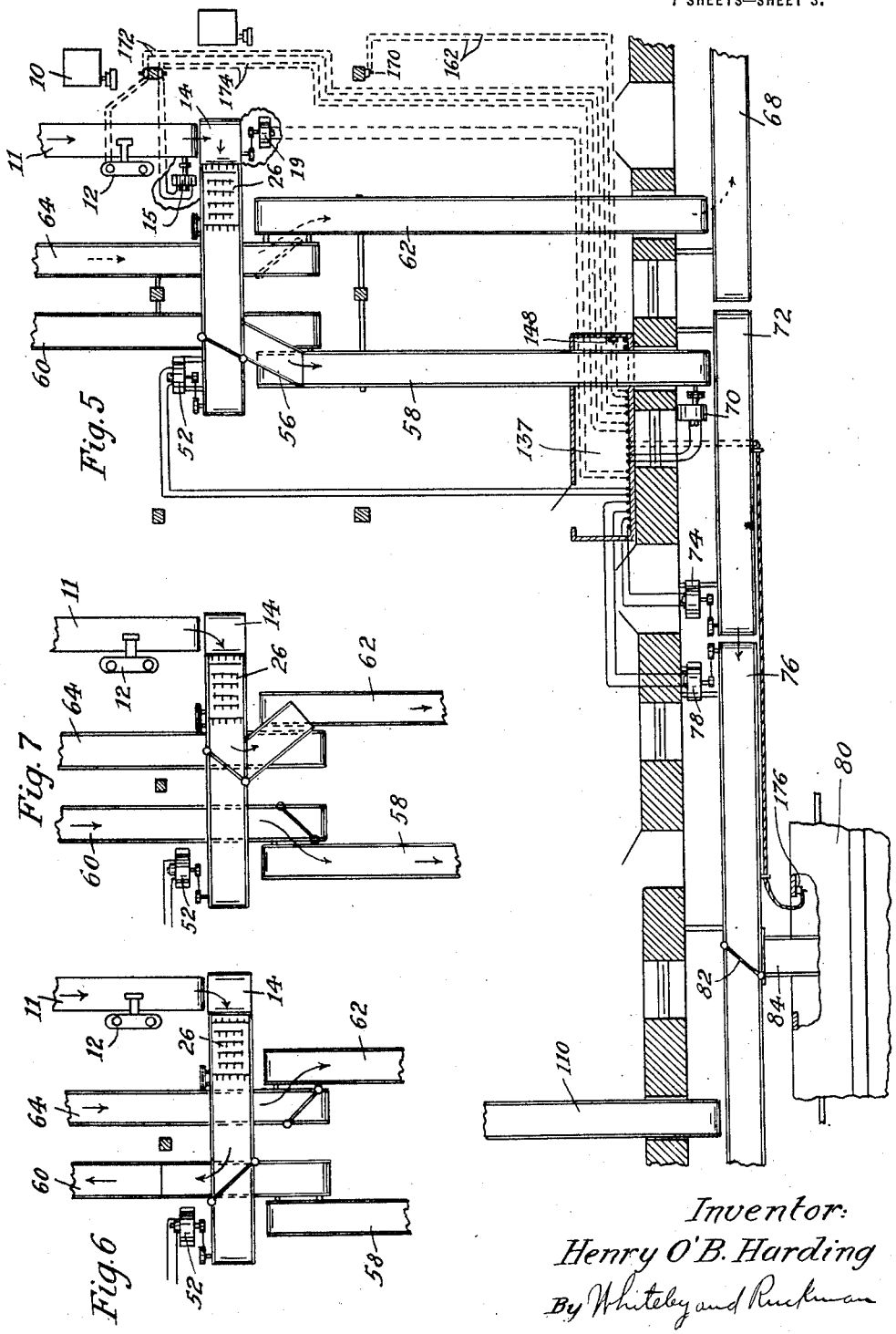

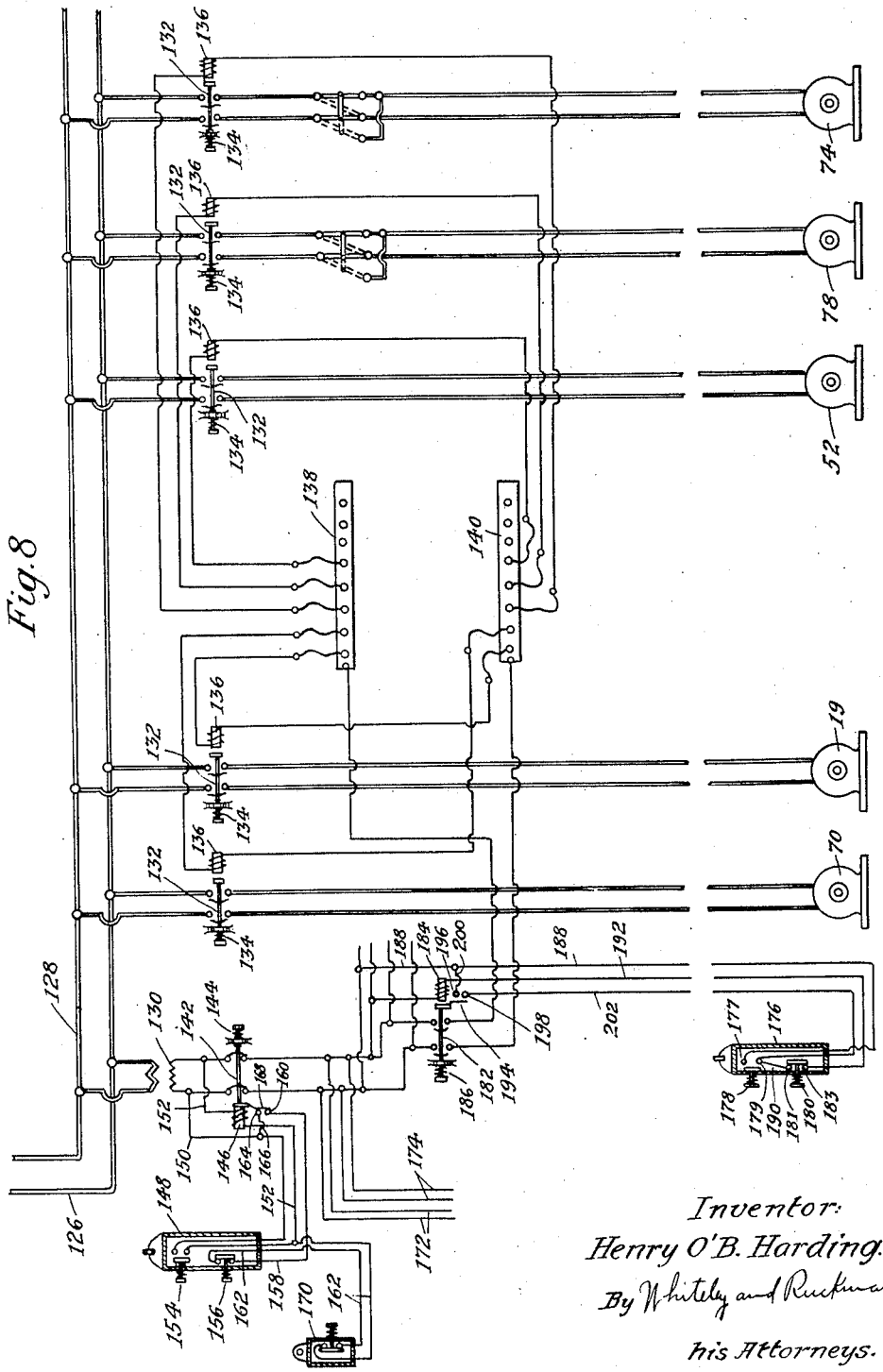

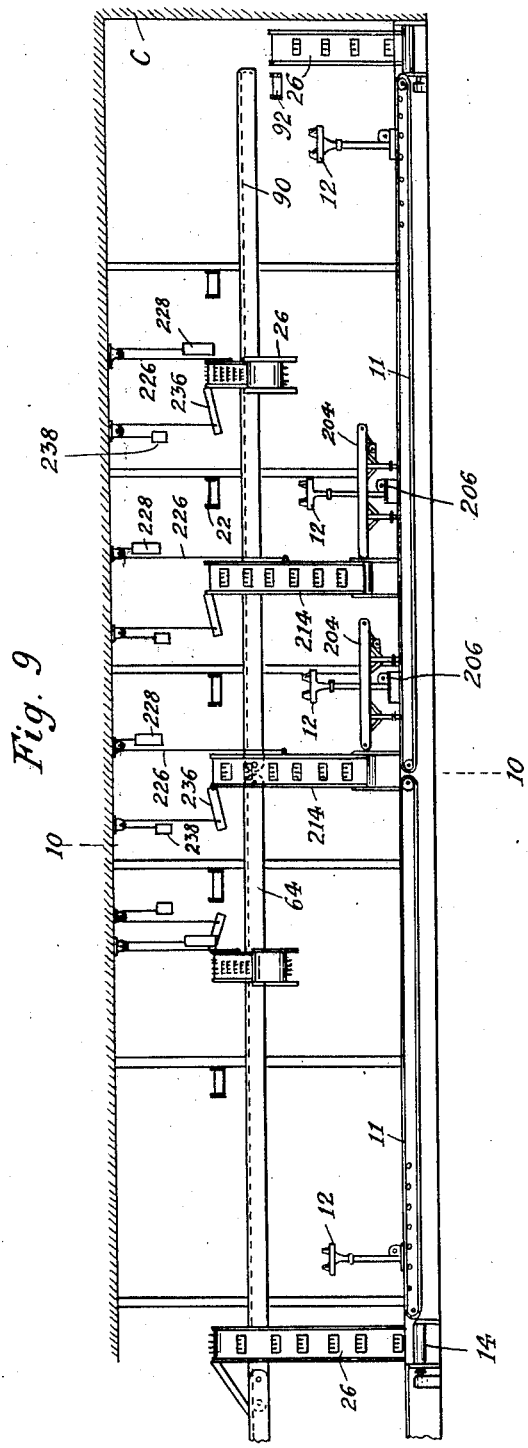

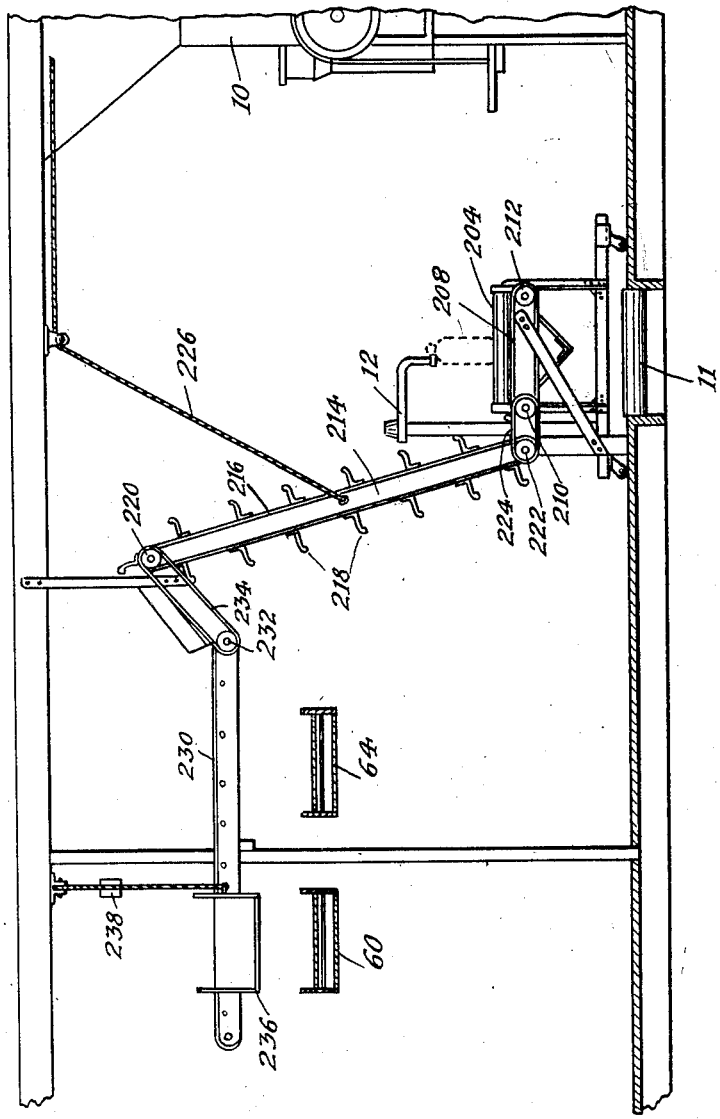

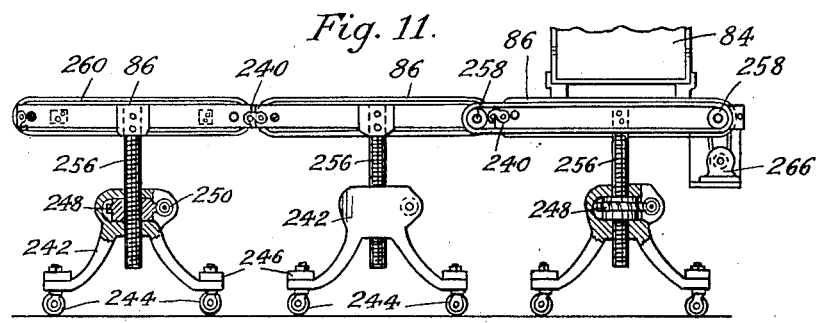
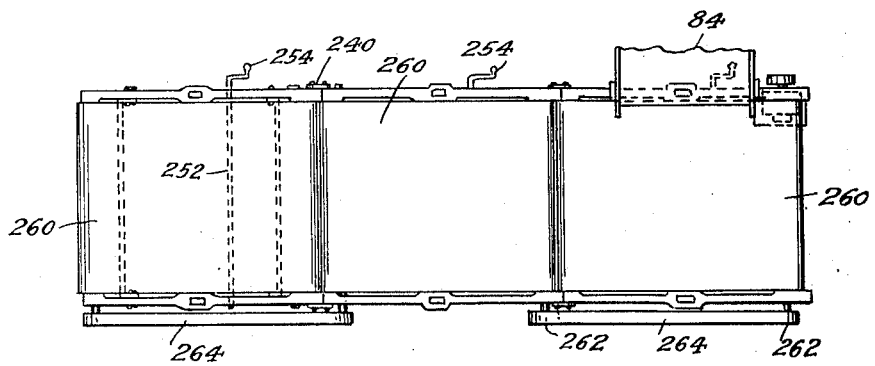
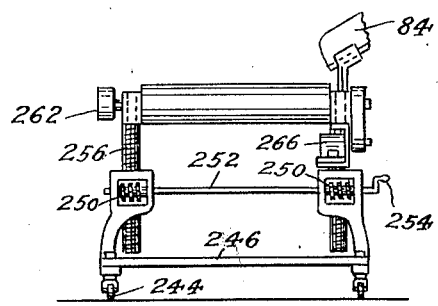

UNITED STATES PATENT OFFICE.

HENRY O'B. HARDING, OF MINNEAPOLIS, MINNESOTA, ASSIGNOR TO WASHBURN CROSBY COMPANY, A CORPORATION OF MINNESOTA.

SYSTEM OF HANDLING FLOUR IN MILLS.

1,357,977.          Specification of Letters Patent.      Patented Nov. 9, 1920.

Application filed May 20, 1919. Serial No. 293,467.

*To all whom it may concern:*

Be it known that I, HENRY O'B. HARDING, a citizen of the United States, residing at Minneapolis, in the county of Hennepin and State of Minnesota, have invented certain new and useful Improvements in Systems of Handling Flour in Mills, of which the following is a specification.

My invention relates to a system of handling flour in mills and more particularly to packing and conveying sacks of flour and loading the same into cars. An object of my invention is to provide a system by the employment of which the flour may be taken from the packers and loaded into cars with the least possible amount of manual handling. Another object is to economize in the amount of floor space required. Another object is the provision of means located at the cars for controlling the operation of the conveyers. Another object is to provide means whereby the facilities of the packing plant may be kept continuously in operation at maximum capacity and the flour packed, may be loaded into cars intermittently but nevertheless in the aggregate as rapidly as the flour is packed. In the employment of my invention I provide a packing room having a multiplicity of packers and a considerable amount of storage space so that all packers are continuously operating to pack flour to the maximum or desired capacity, and the packed sacks may, as the conditions of cars available require, either be delivered from the packers directly to the car or from the packers to the storage space, or from the storage space directly to the cars, or flour may be delivered simultaneously from the packers and from the storage space to the cars. In this manner the packers will be continuously operated at a fixed rate, while the loading into cars will take place intermittently as cars are available, both as regards time of loading and the rate of loading, which may be either less or much greater than the rate at which the flour is packed. In carrying out my invention I provide systems of conveyers arranged in proximity to the packers, and also in proximity to the storage space, said conveyers ultimately leading to conveyer mechanism for delivering the sacks into the cars. And I provide elevator devices or boosters for lifting sacks up to and delivering upon the conveyers, some of said boosters being fixed and others particularly those used in connection with stored flour, being portable.

The full objects and advantages of my invention will appear in connection with the detailed description thereof and the novel features embodied in my inventive idea will be particularly pointed out in the claims.

Referring to the drawings which illustrate the application of my invention,—

Figure 1 is a plan view of the packing room and arrangement of conveyers. Fig. 2 is a top plan view showing the manner in which sacks after being filled are positioned and carried to an elevating apparatus. Fig. 3 is a view mostly in section on the line 3—3 of Fig. 2. Fig. 4 is a front elevational view of the portion of the apparatus shown in Fig. 2. Fig. 5 is a plan view of a portion of the conveying system and electrical wiring. Fig. 6 is a plan view showing another manner in which the conveyer system can be set. Fig. 7 is a plan view of still another manner of setting the conveyers. Fig. 8 is a view showing an arrangement of electrical wiring and switches. Fig. 9 is a longitudinal elevational view looking from the position indicated by the line 9—9 in Fig. 1 and showing the use of portable conveyers. Fig. 10 is a transverse view on the line 10—10 of Fig. 9. Fig. 11 is a side elevational view of a plurality of short conveyers for use in cars. Fig. 12 is a view at right angles to Fig. 11. Fig. 13 is a top plan view of the construction shown in Fig. 11.

Referring to the particular construction shown in the drawings, C designates the packing room of a flour mill in which there are a plurality of packers, indicated by the character 10, for packing flour into sacks, the packers being preferably arranged in a row. Parallel with the line of packers are a number of traveling belts 11 in alinement with each other and which carry the filled sacks under sewing machines or closing devices 12 operated by motors 9 for closing the tops of the filled sacks. The sacks when taken from the packers are placed in upright position upon the belts 11 which convey them under the closing devices 12. The belts 11 are driven by pulleys 13 secured to the shaft of one of the supporting rollers located at each end of the belt, these pulleys being connected to the shafts of motors 15. After the sacks have been closed, they pass on to the delivery ends of the belts, where they are tipped over in the direction in which they are being conveyed upon short cross belts 14 traveling in the direction indicated by the arrow *b* at right angles to the direction of travel of the belts 12 indicated by the arrow *a*. The cross belts 14 are located at a somewhat lower level than the belts 11 and these belts 14 pass around the rollers 16 and 18, the upper stretch of the belts being supported by idlers 20. A driving pulley 17 is secured to the shaft of one of the end rollers of each of the belts, and this pulley is connected to the shaft of a motor 19. Adjacent the delivery ends of the belts 14 are combs 22 attached to frames 24, while coöperating with the belts 14 are endless elevating belts 26 which on their upward stretch engage supporting members or boards 27. The elevating belts pass over upper rollers 28 and lower rollers 30, these rollers being mounted in side members 32 and 34. A sprocket 29 is secured to the shaft of the upper roller. Attached to the belts 26 at regular intervals are sack-lifting members 36 consisting of fingers adapted to pass between the teeth of the comb 22. The elevating belts deliver the sacks to belts or conveyers running below the ceiling of the room, so that the belts are out of the way and do not obstruct the floor space. One elevating device or booster may serve either two or more packers and the boosters deliver the sacks upon a traveling belt 44 passing over rollers 46 and 48, the shaft of the roller 46 being provided with a pulley 50 connected to the shaft of a motor 52. The shaft of the roller 48 is provided with a sprocket 31 which is connected by a chain 53 with the sprocket 29 previously mentioned. Adjacent the upper end of the belt 26 is an inclined plate 38 having teeth 40 between which the sack-engaging members 36 pass. The sacks are shifted from the belt 44, as shown in Fig. 3, by an inclined member or deflector 54 into a chute 56, which may be set to deliver upon any one of belts 58, 60 or 62 as shown in Figs. 5, 6 and 7. As shown in Figs. 6 and 7 the belt 60 may be driven in opposite directions, and the other conveyer belts may also be driven in reverse direction when desired by reversing the motors which drive them. One end of the belt 60 is lapped by an end of the belt 58 which leads through the wall of the building, while the end of a belt 64 laps the end of the belt 62 which also leads through the wall of the building. The belt 62 is driven by a motor 63 and discharges upon a belt 68 driven by a motor 69 and running at right angles to the belt 62. The belt 58 is driven by a motor 70 and discharges upon a belt 72 driven by a motor 74 and running at right angles to the belt 58. The belt 72 is in longitudinal alinement with the belt 68 and also with a belt 76 driven by a motor 78. The belts 68, 72 and 76 may be driven in either direction as desired and extend parallel to tracks on which cars 80 may be positioned. Deflectors 82 may be placed in any suitable position across the belts 68, 72 and 76 to deflect the sacks into chutes 84 extending into the cars. As shown in Fig. 1, the chutes may extend through a car upon the first track and deliver into a car upon the second track or the one farther from the mill. The chute 84 may deliver upon the first of a number of short conveyers 86 in the car which convey the sacks to the desired place for loading. The particular construction of the conveyers 86 will be described later. The inner ends of the belts 60 and 64 are in alinement with parallel belts 88 and 90. Running at right angles to the latter belts adjacent their outer ends is a belt 92 driven by a motor 94 and delivering by means of a chute 96 into cars 98 positioned at the other side of the building from the cars 80. The belt 92 is lapped by a belt 100 driven by a motor 102, and which may also deliver into the cars 98. Extending at right angles to the belt 100 is a belt 104 adjacent a side wall of the building and driven by a motor 106. In longitudinal alinement with the belt 104 is a belt 108, and in alinement with the latter belt is a belt 110, these belts being driven by motors in a manner similar to the belts previously described. When cars are available, the closed sacks are conveyed directly thereto by the conveyer system in the manner described. When cars are not available, the closed sacks after passing the sewing machines are removed from the floor belts and stored in the space X of the packing room, from whence the sacks may be removed when cars are available in the manner now to be described. A rail 112 extends parallel to the belts 104, 108 and 110, and this rail serves to support the upper end of a booster 114, which may be moved to suitable position along the rail, and which may be operated by means of a connection 116, which may be connected to any one of plug sockets located at the different posts 118. This booster serves to elevate the sacks placed thereon to the belts which convey the sacks to cars. A portable booster 120 also serves to elevate the stored sacks to anyone of a series of transverse belts 122, from which they are delivered by deflectors 124 to the belts 60, 88, 64 or 90 as desired.

The wiring and switches for operating and controlling the system are shown particularly in Figs. 5 and 8. Referring to Fig. 8, the main feed wires 126 and 128 are connected to a transformer having a secondary coil 130. The various motors of the conveyer belts, such as the motors 19, 52, 70, 74 and 78, are connected to the feed wires through switches 132, which are held open by springs 134 except when the switches are maintained in closed position by means of the electromagnet 136 when energized by current coming from the secondary coil 130. As shown in Figs. 1 and 5, the switches may be located at a switch-board 137. By means of the bus-boards 138 and 140, as many of the electromagnets 136 as desired may be connected with the secondary coil. Unless the electromagnets are thus connected, it is obvious that the springs 134 will at all other times hold open the switches 132 and hence the corresponding motors will not be operated. The secondary coil 130 is connected to a switch 142 which is held open by a spring 144 except when the switch is maintained in closed position by means of the electromagnet 146 when energized by current. The secondary coil is connected to a master switch 148 by the wires 150 and 152, the latter having a portion which constitutes the coil of the electromagnet 146. The master switch has a starting button 154 normally held in open position by a spring, and also has a stop button 156 normally held in closed position by a spring. The wires 150 and 152 are connected to contact studs adjacent the button 154, and these studs are adapted to be connected by pushing the button. The stop button 156 is located adjacent two contact studs one of which is connected by a wire 158 to a stud 160 located near the electric magnet, while the other stud is connected by a wire 162 to a junction with the wire 152. Adjacent the stud 160 is a stud 164 connected by a wire 166 with a junction with the wire 150. Attached to the armature of the electromagnet 146 is a bridge member 168 adapted to bridge the studs 160 and 164 when the electromagnet is energized. The operation of this portion of the apparatus will now be clear. Assuming the parts to be as shown in Fig. 8, the current produced in the secondary coil 130 passes through the wires 150 and 166, the bridge 168 and the wires 158, 162 and 152, including the coil of the electromagnet whereby the switch 142 is maintained in closed position. If the button 156 is momentarily depressed, the circuit is broken and the switch 142 opens and remains opened until the button 154 is pressed. When this is done, the current passes through the wire 150, the bridge formed by the button 154 and the wire 152, including the coil of the electromagnet whereby the switch is closed. Upon releasing the button 154 the current continues to flow in the manner previously described, since the button 156 is maintained in closed position. One or more push buttons 170 operating similarly to the button 156 may be placed in the circuit through the wire 162 at any convenient position in the mill. It is obvious that when either the buttons 156 or 170 are momentarily depressed, the current to all of the motors of the system will be cut off and the entire system will therefore be stopped. The motors for the sewing machines are operated by current through wires 172, while the motors for the floor belts 11 are operated by current through wires 174. In order that these motors may continue to operate and at the same time to provide for stopping the motors of the conveying system, the following arrangement is adopted. A switch 176 is adapted to be attached to any one or more of the cars being loaded. This switch has a starting button 178 and a stop button 180, the button 178 being normally held by a spring so as not to bridge studs 177 and 179 while the button 180 is normally held by a spring so as to bridge studs 181 and 183. A switch 182 is located in the circuit of the secondary coil 130 at a place beyond where the wires 172 and 174 are connected to the said circuit. This switch is held open by a spring 186 except when maintained closed by an electromagnet 184. As shown in Fig. 8, when the button 178 is pushed the current passes through the wire 188 to the studs 177 and 179, through the wire 190 to the studs 181 and 183, and through the wire 192, including the coil of the electromagnet, which is thereby energized so that the armature brings the attached bridge 194 into contact with studs 196 and 198. The stud 196 is connected by means of a wire 200 with the wire 188. When the button 178 is released, the current continues through the wire 188, the wire 200, the bridge 194, a wire 202 leading to the stud 179, the wire 190 and the wire 192, through the coil of the electromagnet 184. When the button 180 is pushed the circuit through the switch 182 is broken and the current to the conveyer motors is cut off. On account of the current through the wires 172 and 174 not going through the switch 182, the motors of the sewing machines and the floor belts will continue to operate. In this manner the supply of sacks to a car may be cut off whenever desired, as, for instance, when the car is completely loaded, without interrupting the operation of the sewing machines and the floor belts.

Figs. 9 and 10 illustrate additional means for carrying filled sacks underneath the closing devices 12, elevating the closed sacks and delivering them to the belts of the conveyer system. In this case small portable conveyers 204 mounted on caster wheels are placed over the floor belts 11 and underneath the closing devices 12, the caster wheels resting upon the floor at both sides of the floor belts. The endless belts of these portable conveyers are driven by electric motors 206 mounted on brackets with which the frames of the portable conveyers are provided. The endless belts of these conveyers carry the filled sacks under the closing devices 12 and deliver the closed sacks to short cross belts 208 running over rollers 210 and 212 mounted in a frame attached to the lower ends of boosters 214, these boosters having endless elevating belts 216 provided with sack-engaging fingers 218. The belts 216 run over upper rollers 220 and lower rollers 222, the shafts of the rollers 222 being connected to the shafts of the rollers 210 by sprocket chains 224. The boosters 214 are pivotally mounted on the shafts of the upper rollers 220 and are provided with cables 226 and counterweights 228 so that they may be swung up out of the way when not in use. The sacks after they have been elevated, are delivered upon endless belts 230, each of which passes over a roller 232, the shaft of which is connected by a sprocket chain 234 with the shaft of the roller 220. The belts 230 deliver upon the belts 60, 64, 88 or 90 of the conveyer system as desired, and in order to deliver the sacks to these belts, pivoted chutes 236 provided with counterweights 238 may be employed.

Figs. 11, 12 and 13 illustrate the construction of the short conveyers 86 previously referred to as used in the cars. One of these conveyers is placed adjacent the delivery end of the chute 84 leading into a car, and any desired number of these conveyers according to the part of the car which is being loaded may be fastened together by means of hooks 240. Each of these conveyers comprises a pair of pedestals 242 mounted on casters 244, the pair of pedestals being connected by a crossbar 246. Each pedestal is formed with a recess in its upper portion to receive a worm wheel 248 adapted to be turned by a worm 250, a pair of these worms being secured to a shaft 252 journaled in the pedestals and provided with a handle 254. Each worm wheel 248 has a screw-threaded opening adapted to receive a screw-threaded stem 256, a pair of these stems supporting the frame of a conveyer which may thus be adjusted to the desired height. The frame is provided at each end with a roller 258, an endless conveyer belt 260 passing over the two rollers of each conveyer. The shafts of the rollers of each conveyer are provided with pulleys 262 by means of which a roller of one conveyer may be connected by a driving belt 264 with a roller of an adjacent conveyer. Any desired number of conveyers may thus be connected together in longitudinal alinement with each other and may be driven in unison to deliver sacks at the proper place in the car for loading. The first conveyer, or the one adjacent the chute 84, is driven by an electric motor 266 mounted thereon by means of a bracket.

The advantages of my system will be readily understood from the foregoing description. When cars are available, they are moved into proper position on the track adjacent the mill and the closed sacks are delivered directly to the carrier system, which conveys them into position for loading into the cars. When this procedure is followed, it is unnecessary to provide for taking away the closed sacks manually, and it is not necessary to utilize space in the packing room for storing purposes. However, when there is a shortage of cars, the packers may still continue in operation and the closed sacks are removed and stored in the space provided for this purpose. As soon as cars become available, the stored sacks may be taken from the storage space and delivered directly to the same carrier system previously referred to, which then conveys them to the cars. It is obvious that the employment of my system reduces manual handling of the sacks to a minimum and requires less space than is the case when all of the sacks which are being filled and closed are removed by truckers. It is further apparent that the packers may be operated at full capacity all of the time and sacks may be simultaneously delivered to cars from the packers and from the storage space over the same carrier system. On account of the arrangement of the belts of the carrier system, and their capability of being reversed in direction, it is also obvious that sacks may be sent over different routes for delivery to cars as the desirability or necessity for so doing arises.

I claim:

1. A system for handling flour in mills consisting of packers for packing flour into sacks, said packers being located in the packing room of a mill, floor belts adjacent said packers, sewing machines under which the filled sacks are carried by said belts for closing the tops of the sacks, conveyers in said packing rooms to which the closed sacks are delivered, conveyers upon which said first-named conveyers discharge, said second-named conveyers being located outside the mill for discharging into cars, and means adapted to be positioned at the cars which are being loaded for starting and stopping said conveyers while permitting said packers, floor belts and sewing machines to operate continuously.

2. A system for handling flour in mills consisting of packers for packing flour into sacks, said packers being located in the packing room of a mill, conveyers for conveying the sacks as they are filled to cars located adjacent the mill, means adapted to be positioned at the cars which are being loaded for controlling the operation of said conveyers, and means for delivering sacks stored in said packing room to said conveyers.

3. A system for handling flour in mills consisting of packers for packing flour into sacks, said packers being located in the packing room of a mill, means for elevating said filled sacks, conveyers to which said elevated sacks are delivered for conveying the same to cars, means adapted to be positioned at the cars which are being loaded for controlling the operation of said conveyers and said elevating means, and separate elevating means for delivering sacks stored in said packing room to said conveyers.

4. A system for handling flour in mills consisting of packers for packing flour into sacks, said packers being located in the packing room of a mill, floor belts adjacent said packers, sewing machines under which the filled sacks are carried by said belts for closing the tops of the sacks, means for elevating said filled sacks, conveyers to which said elevated sacks are delivered for conveying the same to cars, means adapted to be positioned at the cars which are being loaded for controlling the operation of said conveyers and said elevating means while permitting said packers, floor belts and sewing machines to operate continuously, and separate elevating means for delivering sacks stored in said packing room to said conveyers.

5. A system for handling flour in mills consisting of packers for packing flour into sacks, said packers being located in the packing room of a mill provided with a storage space, means for elevating the filled sacks as they come from the packers, conveyers to which the elevated sacks are delivered for conveying the same to cars, and portable devices for elevating stored sacks to said conveyers.

6. A system for handling flour in mills consisting of packers for packing flour into sacks, said packers being located in the packing room of a mill, floor belts adjacent said packers for receiving filled sacks, means for elevating the sacks delivered thereto by said floor belts for elevating the sacks delivered thereto by said floor belts, conveyers to which the elevated sacks are delivered for conveying the same to cars, portable conveyers adapted to be positioned over said floor belts for receiving filled sacks, and means for elevating the sacks delivered thereto by said portable conveyers, said last mentioned elevating means being arranged to deliver sacks to said first mentioned conveyers.

7. A system for handling flour in mills consisting of packers for packing flour into sacks, said packers being located in the packing room of a mill provided with a storage space, floor belts adjacent said packers for receiving filled sacks, means for elevating the sacks delivered thereto by said floor belts, conveyers to which the elevated sacks are delivered for conveying the same to cars, portable conveyers adapted to be positioned over said floor belts for receiving filled sacks, means for elevating the sacks delivered thereto by said portable conveyers, said last mentioned elevating means being arranged to deliver sacks to said first mentioned conveyers, portable devices for elevating stored sacks to said first mentioned conveyers, and portable conveyers adapted to be positioned in the cars for receiving sacks from said first mentioned conveyers.

In testimony whereof I hereunto affix my signature.

HENRY O'B. HARDING.